US011299078B2

(12) United States Patent
Yamamoto et al.

(10) Patent No.: US 11,299,078 B2
(45) Date of Patent: Apr. 12, 2022

(54) ARMREST

(71) Applicants: AUTONETWORKS TECHNOLOGIES, LTD., Mie (JP); SUMITOMO WIRING SYSTEMS, LTD., Mie (JP); SUMITOMO ELECTRIC INDUSTRIES, LTD., Osaka (JP); SUMITOMO RIKO COMPANY LIMITED, Aichi (JP); TOKAI CHEMICAL INDUSTRIES, LTD., Gifu (JP)

(72) Inventors: Satoshi Yamamoto, Mie (JP); Makoto Higashikozono, Mie (JP); Kaho Hayashi, Mie (JP); Hideki Oshima, Aichi (JP); Takahiko Endo, Gifu (JP); Keiji Makino, Gifu (JP); Jun Jin, Gifu (JP); Takemasa Okumura, Gifu (JP)

(73) Assignees: AUTONETWORKS TECHNOLOGIES. LTD., Mie (JP); SUMITOMO WIRING SYSTEMS, LTD., Mie (JP); SUMITOMO ELECTRIC INDUSTRIES, LTD., Osaka (JP); SUMITOMO RIKO COMPANY LIMITED, Aichi (JP); TOKAI CHEMICAL INDUSTRIES, LTD., Gifu (JP)

( * ) Notice: Subject to any disclaimer, the term of this patent is extended or adjusted under 35 U.S.C. 154(b) by 0 days.

(21) Appl. No.: 16/967,598

(22) PCT Filed: Jan. 23, 2019

(86) PCT No.: PCT/JP2019/001995
§ 371 (c)(1),
(2) Date: Aug. 5, 2020

(87) PCT Pub. No.: WO2019/155882
PCT Pub. Date: Aug. 15, 2019

(65) Prior Publication Data
US 2021/0276467 A1    Sep. 9, 2021

(30) Foreign Application Priority Data
Feb. 9, 2018  (JP) .............................. JP2018-022259

(51) Int. Cl.
B60N 2/75         (2018.01)
(52) U.S. Cl.
CPC ................ B60N 2/79 (2018.02); B60N 2/797 (2018.02)
(58) Field of Classification Search
CPC .......... B60N 2/797; B60N 2/79; B60N 99/00; B60R 11/0241
See application file for complete search history.

(56) References Cited

U.S. PATENT DOCUMENTS

| 4,948,541 A | 8/1990 | Beck |
| 5,083,912 A * | 1/1992 | Beck .................. B29C 44/1266 425/117 |

(Continued)

FOREIGN PATENT DOCUMENTS

| GB | 2502674 A | * 12/2013 | ............. B60N 3/102 |
| JP | S61-3034 U | 1/1986 | |

(Continued)

OTHER PUBLICATIONS

International Search Report issued in International Patent Application No. PCT/JP2019/001995, dated Mar. 12, 2019, along with an English translation thereof.

Primary Examiner — David R Dunn
Assistant Examiner — Tania Abraham
(74) Attorney, Agent, or Firm — Greenblum & Bernstein, P.L.C.

(57) ABSTRACT

An armrest includes a first branch cable and a second branch cable, a frame, a skin covering the frame, and a foamed resin (Continued)

material. The frame includes a first routing section and a second routing section in which the first branch cable and the second branch cable are arranged, respectively. The foamed resin material is disposed on an inner side of the skin. The first branch cable and the second branch cable are disposed within the foamed resin material in the first routing section and the second routing section.

18 Claims, 20 Drawing Sheets

(56) References Cited

U.S. PATENT DOCUMENTS

| | | | | |
|---|---|---|---|---|
| 5,996,866 | A * | 12/1999 | Susko | B60R 11/0241 |
| | | | | 224/281 |
| 7,431,392 | B2 * | 10/2008 | Tamara | A47C 7/72 |
| | | | | 297/217.4 |
| 9,150,171 | B2 * | 10/2015 | Kim | B60N 2/79 |
| 10,604,048 | B2 | 3/2020 | Vela et al. | |
| 10,967,773 | B2 | 4/2021 | Vela et al. | |
| 2018/0065521 | A1 * | 3/2018 | Vela | B60N 2/0228 |
| 2020/0180482 | A1 | 6/2020 | Vela et al. | |

FOREIGN PATENT DOCUMENTS

| | | | |
|---|---|---|---|
| JP | H07-016773 U | 3/1995 | |
| JP | 2006-095104 | 4/2006 | |
| JP | 2010-070120 | 4/2010 | |
| JP | 2012-236541 | 12/2012 | |
| JP | 2013-220781 | 10/2013 | |
| WO | WO-9529552 A1 * | 11/1995 | ........... G06Q 20/363 |
| WO | 2016/133638 | 8/2016 | |

* cited by examiner

FIG.2
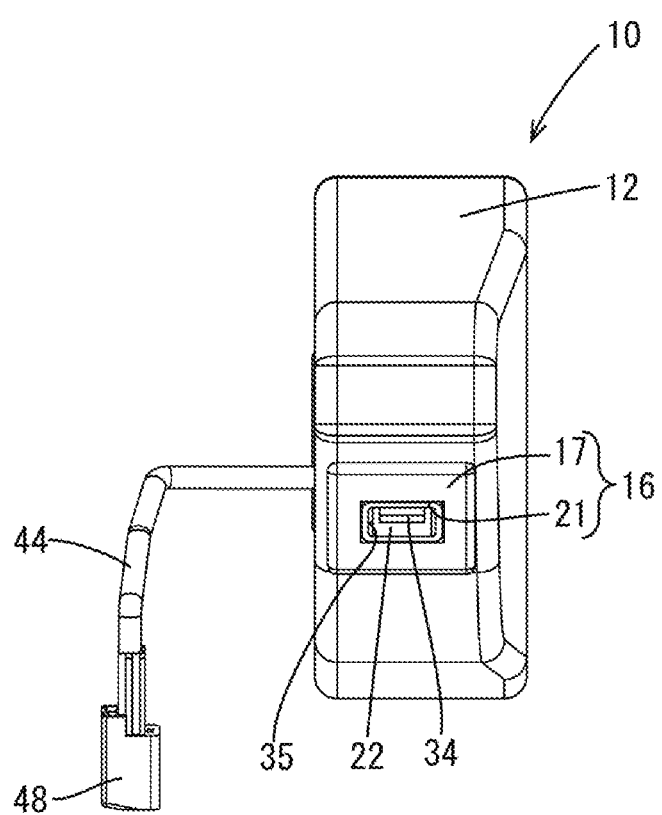
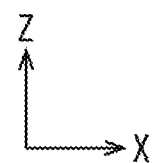

FIG.13
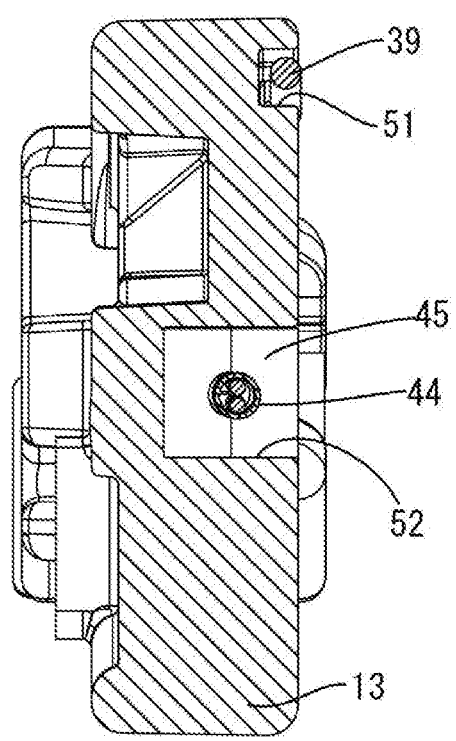
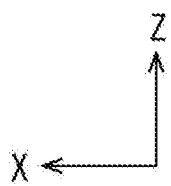

ARMREST

TECHNICAL FIELD

The technology disclosed herein relates to an armrest that is to be mounted on a seat.

BACKGROUND ART

An armrest described in Patent Document 1 has been known as an armrest that is to be mounted on a seat of a vehicle. The armrest includes a skin, a frame arranged inside the skin, and foamed resin material with which the inside of the skin is filled.

RELATED ART DOCUMENT

Patent Document

[Patent Document 1] Japanese Unexamined Patent Application Publication No. 2006-95104

SUMMARY OF THE INVENTION

Problem to be Solved by the Invention

According to the spread of portable devices such as mobile phones, smartphones, and tablet terminals, the connection between the portable device and the vehicle has been demanded for charging the portable device with power of the vehicle or connecting the portable device to an audio device of the vehicle to play music data stored in the portable device.

The connection structure between the portable device and the vehicle is preferably mounted near a vehicle occupant's hand since the portable device is operated with the vehicle occupant's hand. Routing a cable connected to the vehicle within the armrest that is mounted on the seat was tried.

However, in the armrest of the related art, since an inner space of the skin is filled with the foamed resin material, routing the cable inside the armrest is difficult.

The technology described herein was made in view of the above circumstances. An object is to provide an armrest in which a cable is routed.

Means for Solving the Problem

The technology disclosed herein is an armrest that includes a cable, a frame including a routing section where the cable is disposed, a skin covering the frame, and foamed resin material that is disposed on an inner side of the skin. The cable is disposed within the roamed resin material in the routing section.

According to the above configuration, after the cable is routed in the routing section of the frame, the foamed resin material is put in a space that is on an inner side of the skin. Then, the foamed resin material is foamed and accordingly, the cable is put within the foamed resin material. Thus, the cable can be routed within the armrest that includes the foamed resin material therein.

If the armrest receives force, the cable that is protected by the foamed resin material is less likely to receive the force.

Since the cable is disposed within the foamed resin material, a fixing member for fixing the cable is not additionally required. This can simplify the structure of the armrest and reduce the number of components.

The foamed resin material is preferably a soft material in view of protecting the cable from a stress caused by thermal expansion or thermal contraction when a temperature changes in the vehicular built-in environment. Urethane foam, foaming beads, or TIP urethane may be preferably used for such foamed resin material.

Embodiments of the technology described herein may preferably include configurations as follows.

The routing section may include retaining portion that is in contact with the cable to suppress the cable from being released from the routing section before being filled with the foamed resin material.

According to the above configuration, the cable that is routed in the routing section is less likely to drop from the routing section before the inner space is filled with the foamed resin material. This can improve production efficiency of the armrest.

The retaining portion may sandwich the cable from two sides with respect to an extending direction in which the cable extends.

According to the above configuration, since the cable is sandwiched by the holding member from the two sides with respect to the extending direction in which the cable extends, the cable is surely suppressed from dropping from the routing section before the inner space is filled with the foamed resin material.

The routing section may have a groove shape and include a lift-up rib protruding from a bottom wall of the routing section and the lift-up rib extends in a direction crossing an extending direction in which the cable extends.

According to the above configuration, the cable that is disposed in the groove-shaped routing section is away from the bottom wall of the routing section by the protruding dimension of the lift-up rib from the bottom wall at least at the portion thereof corresponding to the first lift-up rib. According to such a configuration, the space between the cable and the bottom wall of the routing section is filled with the foamed resin material. Thus, the cable is surely disposed within the foamed resin material.

The routing section may have a groove shape and include a molding hole in a bottom wall of the routing section and the molding hole may be for forming the retaining portion.

When the space inside the skin is filled with the foamed resin material, the foamed resin material is unlikely to flow to portions far away from an injection portion through which the foamed resin material is supplied. However, in the above configuration, the foamed resin material flows through the molding hole, which is formed in the bottom wall of the groove-shaped routing section, into the routing section. Therefore, the cable that is arranged in the routing section can be surely disposed within the foamed resin member.

The skin may include a skin hole and a socket that is connected to the cable may be exposed from the skin hole.

According to the above configuration, a portable device can be connected the socket included in the armrest that is disposed near the vehicle occupant's hand. According to such a configuration, a cable for connecting a portable device and the socket is not necessary to be routed within a compartment of a vehicle.

The cable may include cables that are arranged in the frame and the socket may include sockets that are connected to the respective cables.

According to the above configuration, the armrest can include multiple sockets. Therefore, portable devices can be connected to the vehicle and this improves convenience for the occupants of a vehicle in using the portable devices.

A cover may be attached to a hole edge of the skin hole and include a cover hole corresponding to the skin hole. The socket may be exposed from the cover hole and a portion of the skin adjacent to the hole edge of the skin hole may be sandwiched between the cover and the socket.

According to the above configuration, the cover and the socket sandwich the portion of the skin adjacent to the hole edge of the skin hole and the foamed resin material that is put in the inner space of the skin is less likely to leak through the skin hole.

The hole edge of the skin hole can be covered and this improves an outer appearance of the armrest.

Furthermore, the socket can be reinforced. Therefore, when a target plug is inserted in or removed from the socket, the force to be applied to the socket can be reduced. Thus, problems are less likely to be caused in the socket.

Advantageous Effects of Invention

According to the technology disclosed herein, a cable can be routed within an armrest.

BRIEF DESCRIPTION OF THE DRAWINGS

FIG. 2 is a front view illustrating the armrest.

FIG. 13 is a cross-sectional view of FIG. 9 taken along XIII-XIII line.

MODES FOR CARRYING OUT THE INVENTION

First Embodiment

A first embodiment of a technology described herein will be described with reference to FIGS. 1 to 17. An armrest 10 in this embodiment is mounted on a side section of a seat 11 of a vehicle, which is not illustrated. In the following description, a Z-direction corresponds to an upper side, a Y-direction corresponds to a front side, and an X-direction corresponds to a left side. A symbol is put on only one of the same components and the symbol may not be put on other ones.

Armrest 10

Figure 1:
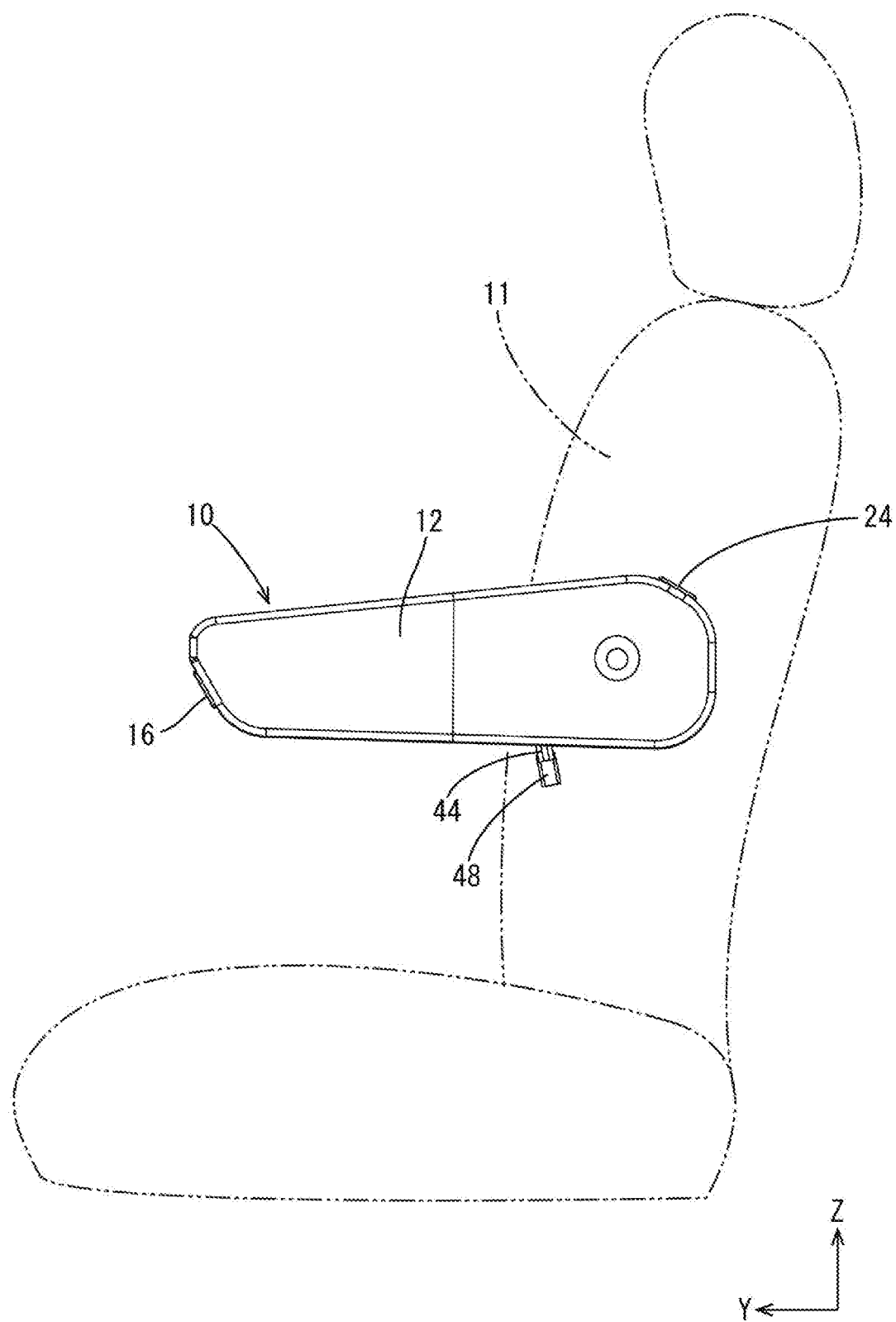
FIG. 1 is a left side view illustrating an armrest according to a first embodiment.

As illustrated in FIG. 1, the armrest 10 extends in a front-rear direction. The armrest 10 includes a front end section that is tapered compared to a rear end section. The armrest 10 is mounted in an overhang state such that the front end section extends frontward and downward. The rear end section of the armrest 10 has a round shape on a border area between an upper surface and a rear-side surface and a border area between the rear-side surface and a lower surface.

The armrest 10 includes a skin 12 having an almost bag shape, a frame 13 that is arranged inside the skin 12, and foamed resin material 14. The inside of the skin 12 is filled with the foamed resin material 14. The skin 12 is made of a cloth or leather.

As illustrated in FIG. 2, a first cover 16 (one example of a cover) made of synthetic resin is attached to a surface of the front end section of the armrest 10 facing obliquely a front-lower side.

The first cover 16 includes a rectangular first plate member 17. The first plate member 17 of the first cover 16 has a first cover hole 21 (one example of a cover hole). A first socket 22 (one example of a socket) is exposed from the first cover hole 21.

Figure 3:
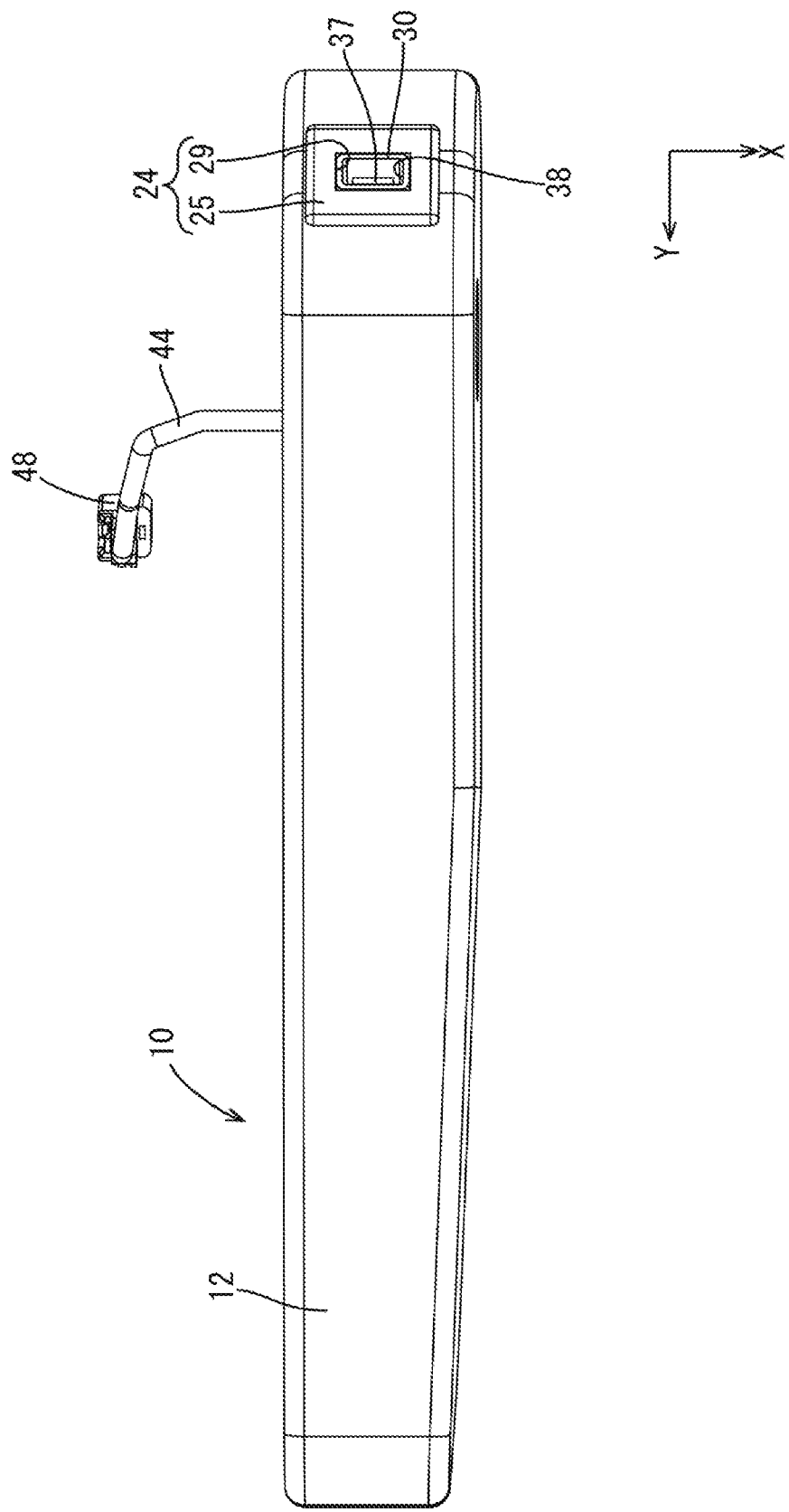
FIG. 3 is a plan view illustrating the armrest.
Figure 4:
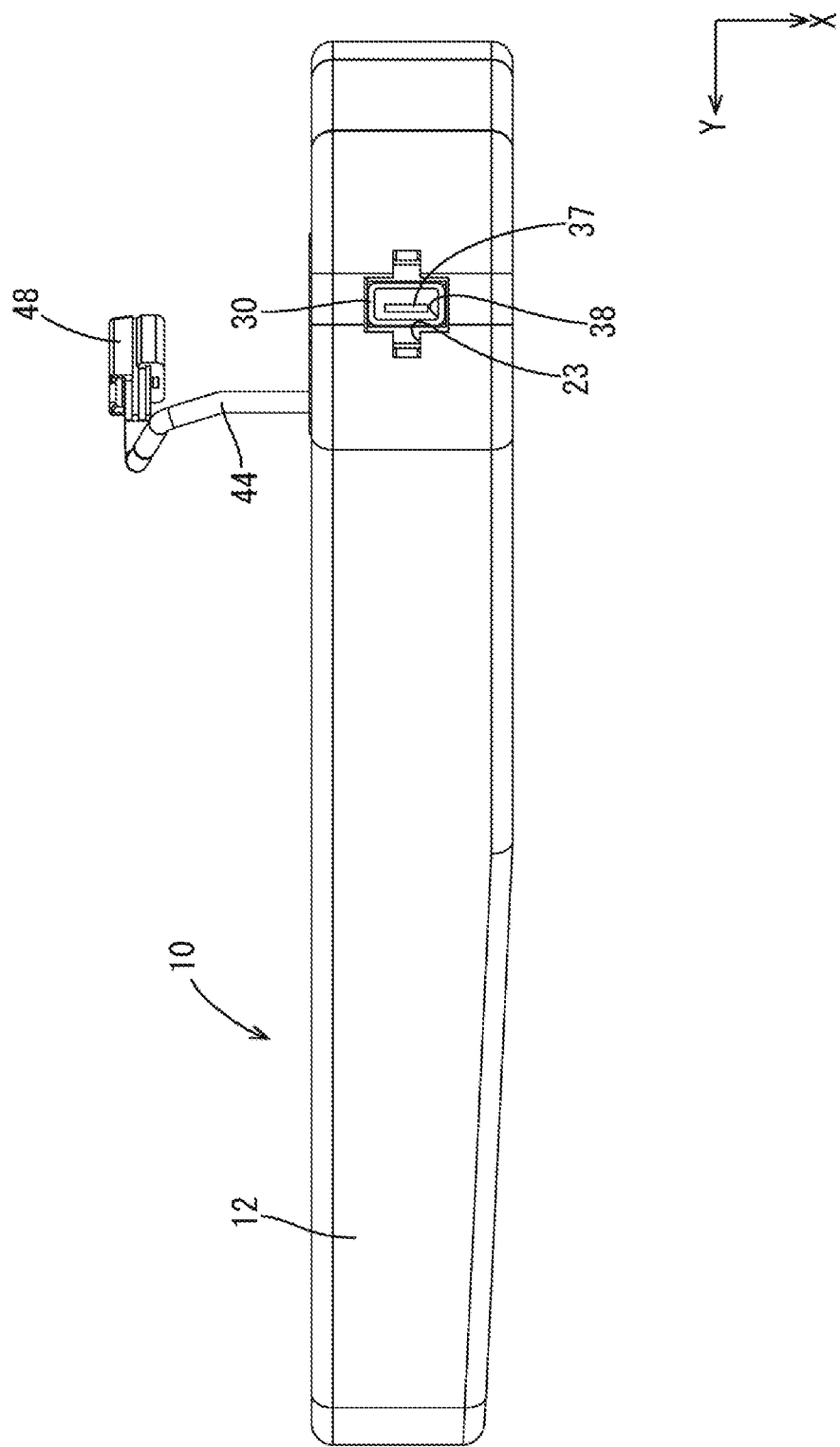
FIG. 4 is a plan view illustrating an armrest wherein a second cover is detached from the armrest in FIG. 3.

As illustrated in FIG. 4, the rear end section of the armrest 10 includes a second skin hole 23 (one example of a skin hole) in the skin 12. The second skin hole 23 is in the border area between the upper surface and the rear-side surface that is a rounded corner of the skin 12. As illustrated in FIG. 3, a second cover 24 (one example of the cover) made of synthetic resin is attached to a vicinity of a hole edge of the second skin hole 23.

Figure 5:
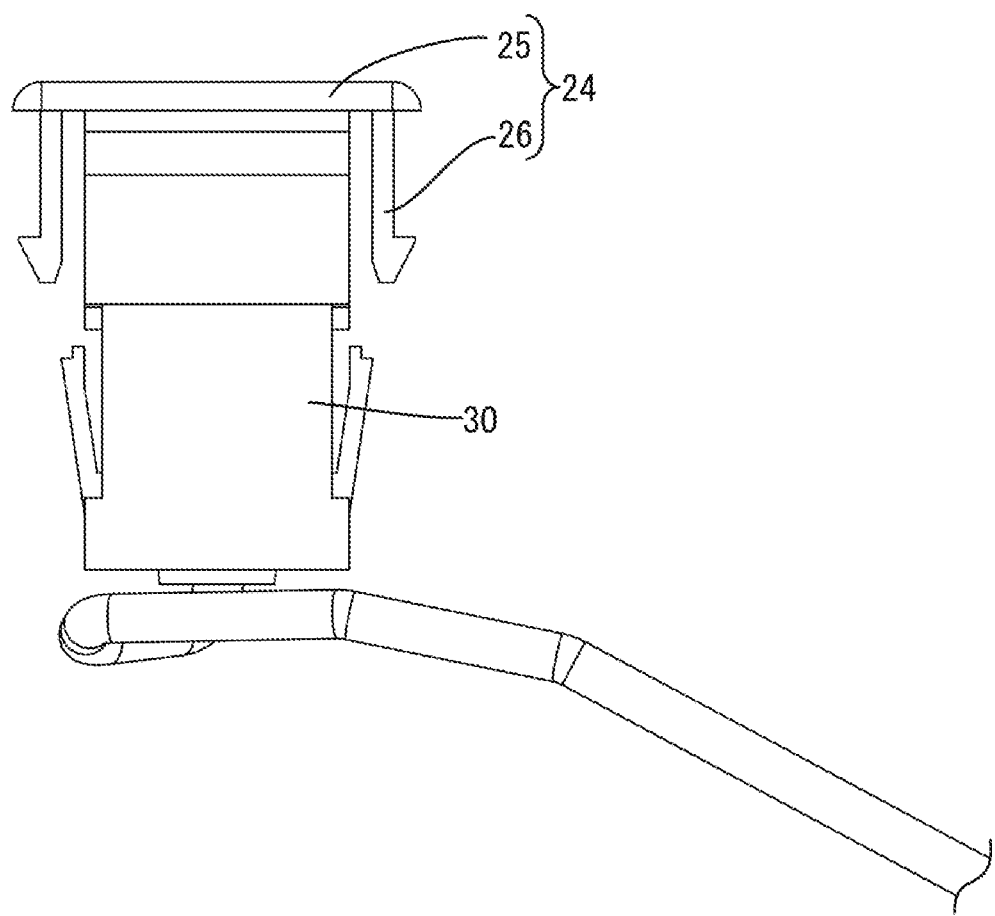
FIG. 5 is an enlarged side view illustrating a second socket and the second cover.

As illustrated in FIG. 5, the second cover 24 includes a rectangular second plate member 25 and a pair of second stopper pieces 26. The second stopper pieces 26 extend from side edges of the second plate member 25, respectively, in a direction perpendicular to a plate surface of the second plate member 25. Distal end portions of the second stopper pieces 26 are stopped by a hole edge of a second stopper hole 28 of a second socket arrangement section 27, which will be described later. Thus, the second cover 24 is fixed to the frame 13. The second plate member 25 of the second cover 24 includes a second cover hole 29 (one example of a cover hole) corresponding to the second skin hole 23. A second socket 30 (one example of a socket) is exposed from the second cover hole 29 and the second skin hole 23.

Figure 6:
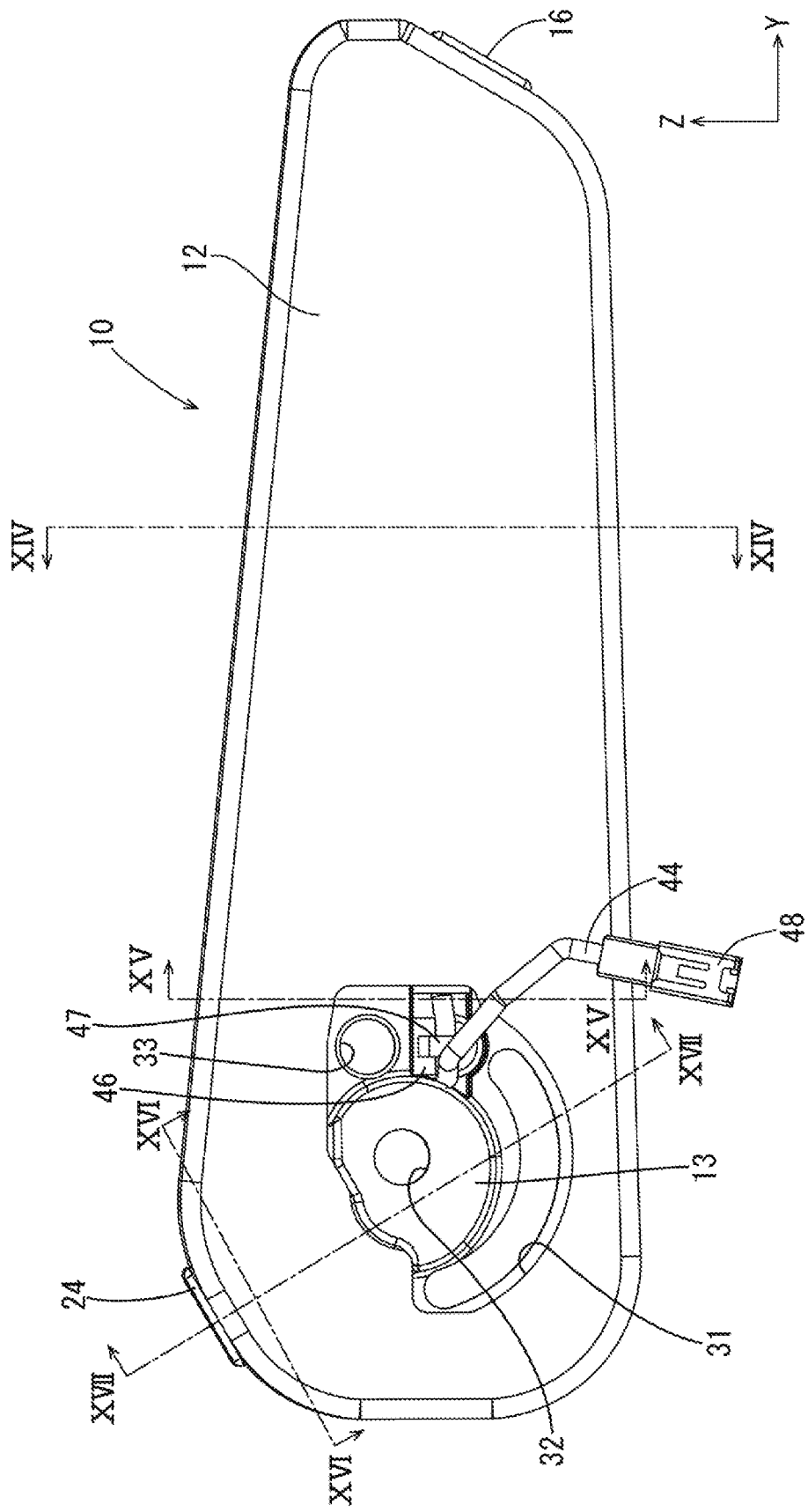
FIG. 6 is a right side view illustrating the armrest.
Figure 7:
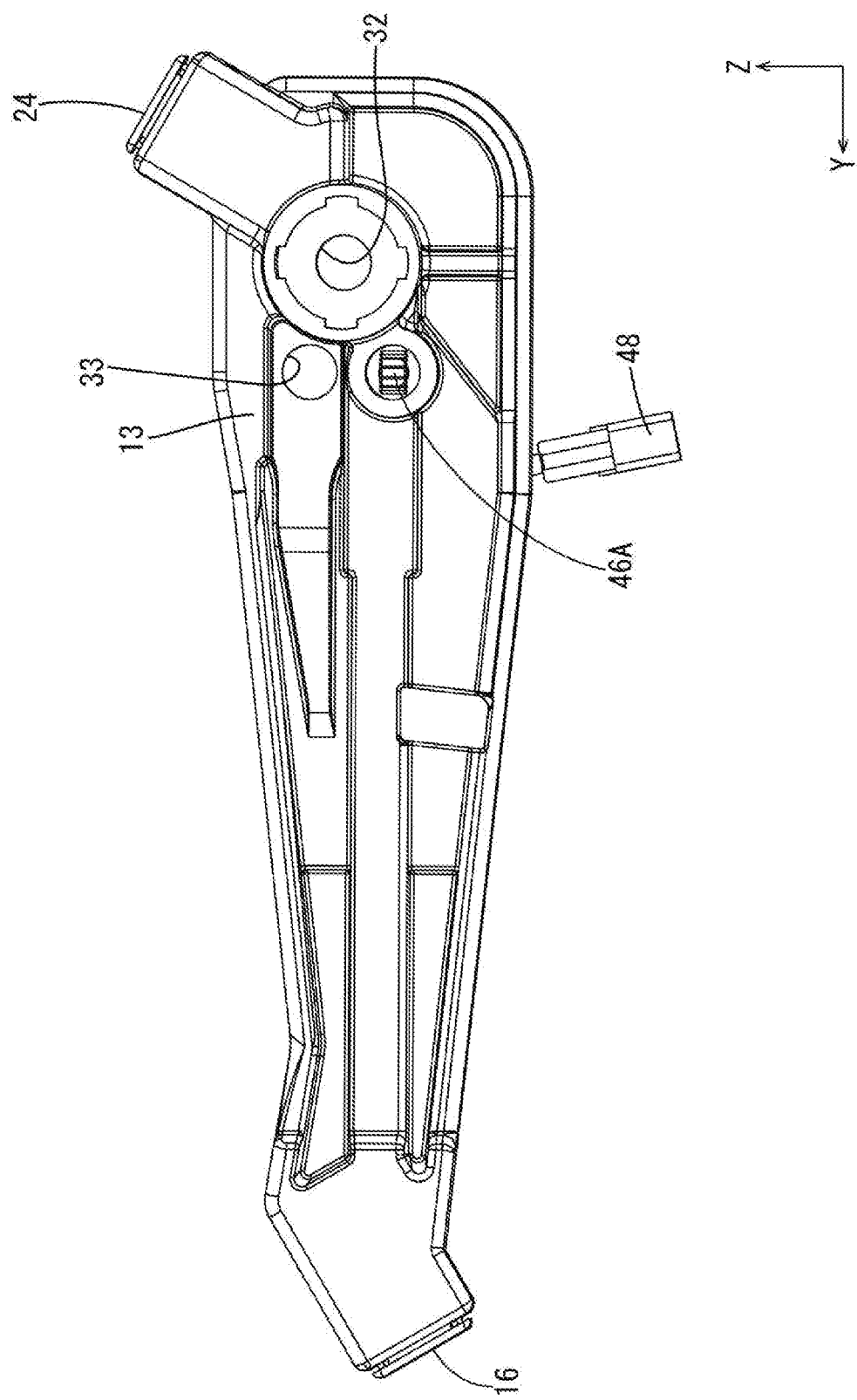
FIG. 7 is a left side view illustrating a frame where a cable is routed.

As illustrated in FIG. 6, the skin 12 on a right side surface of the armrest 10 includes a frame exposing hole 31 that opens rightward. The frame 13 is exposed from the frame exposing hole 31.

Frame 13

The frame 13 includes a mounting hole 32 in a section thereof that is exposed from the frame exposing hole 31. The mounting hole 32 extends in a left-right direction. The armrest 10 is mounted on the seat 11 through the mounting hole 32. A shaft, which is not illustrated, is inserted in the mounting hole 32 and the armrest 10 is fixed to the seat 11 with a known method such as screwing with a bolt.

The frame 13 includes an injection hole 33 in the section that is exposed from the frame exposing hole 31 and is obliquely above the mounting hole 32. The injection hole 33 extends in the left-right direction through the frame 13 and the foamed resin material is injected through the injection hole 33 (refer FIG. 7). A nozzle, which is not illustrated, is inserted in the injection hole 33 and foaming raw material, which will be described later, is injected into the inside of the skin 12.

Figure 8:
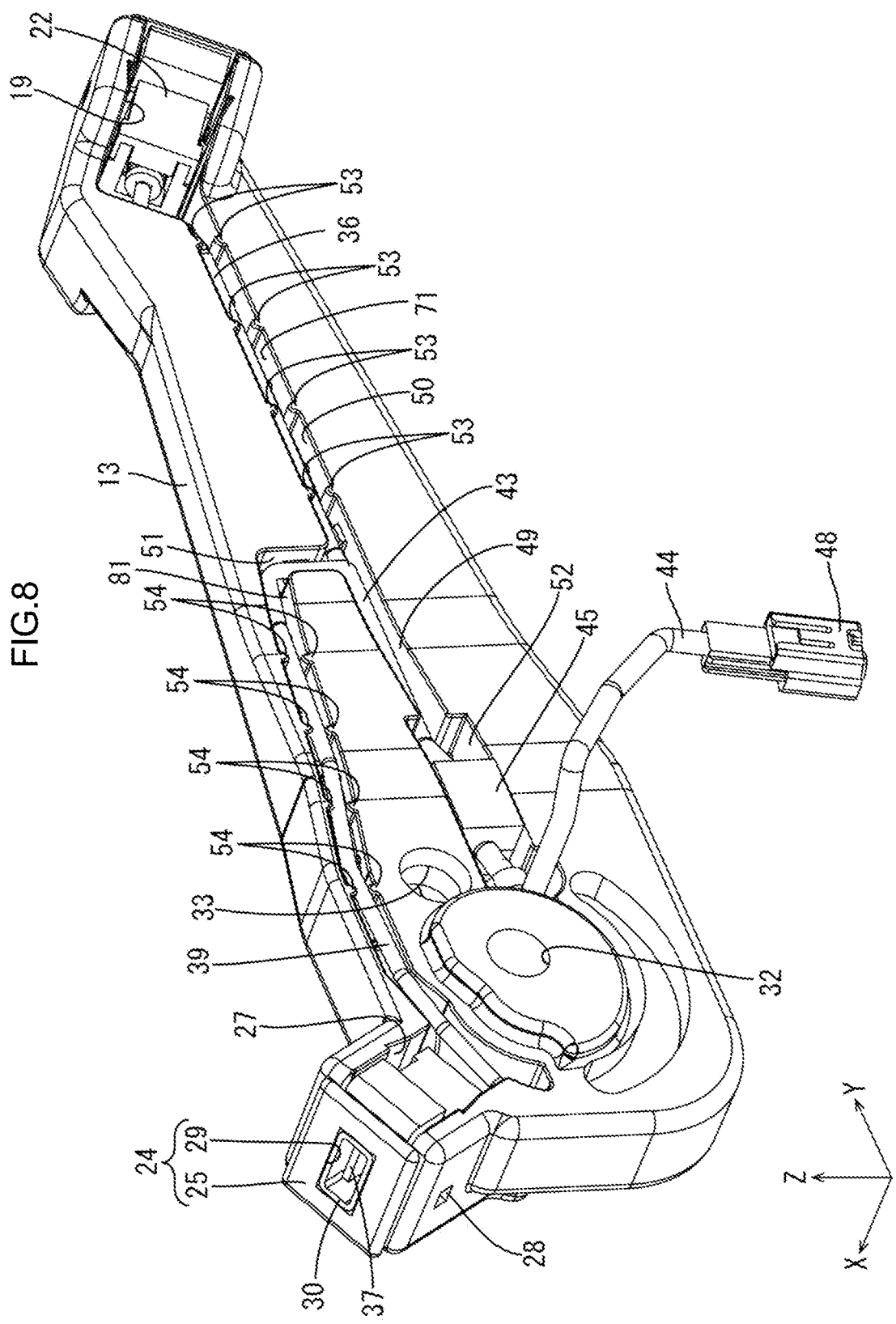
FIG. 8 is a perspective view illustrating the frame where the cable is routed.
Figure 9:
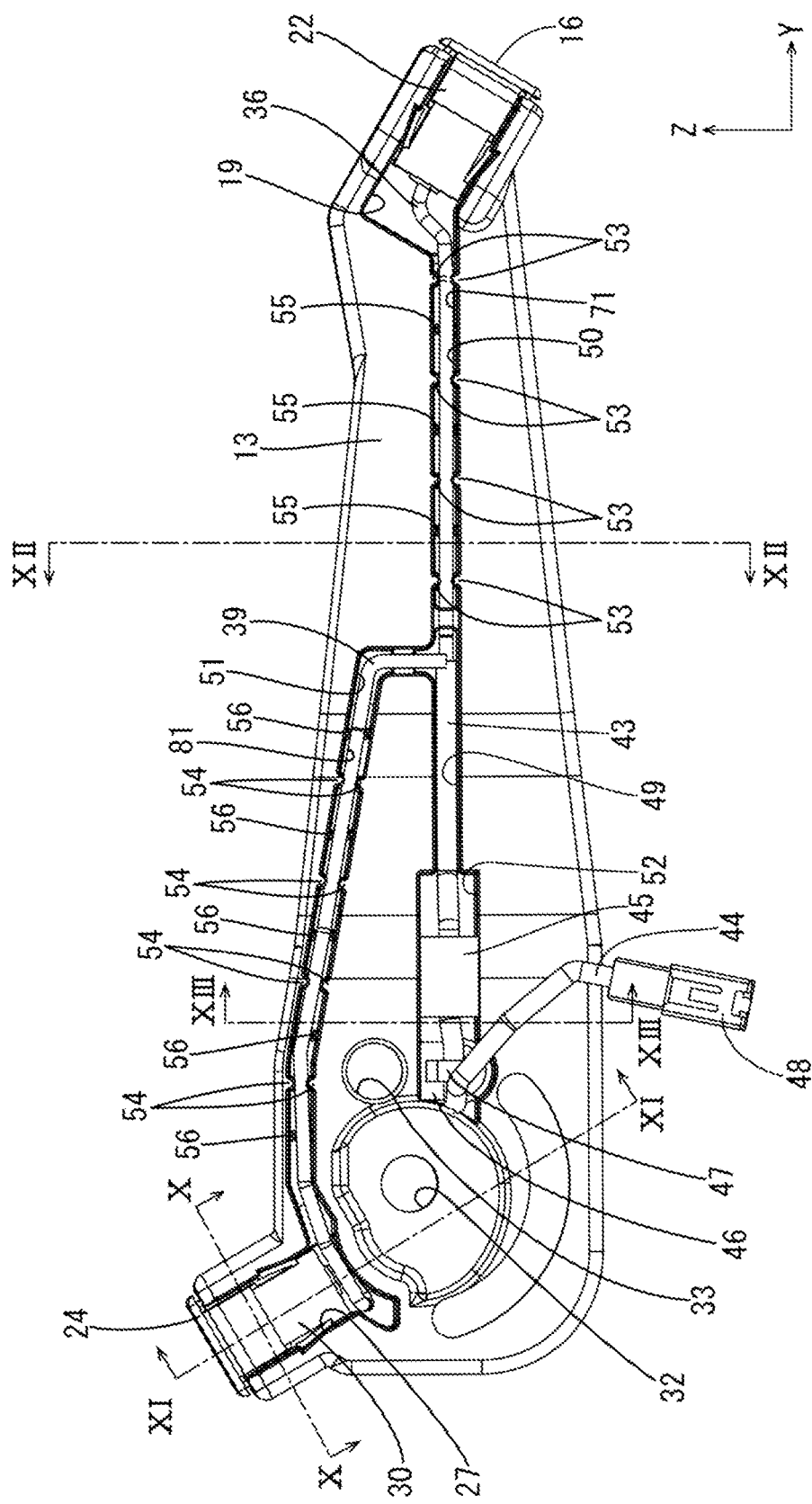
FIG. 9 is a right side view illustrating the frame where the cable is routed.

As illustrated in FIGS. 8 and 9, the frame 13 is made of synthetic resin and molded into a predefined shape with injection molding. The frame 13 extends in the front-rear direction in an elongated shape and the front end section has a tapered shape compared to the rear end section. The frame 13 has a relatively flat shape in the left-right direction.

The frame 13 includes a first socket arrangement section 19 in the front end section. The first socket arrangement section 19 protrudes obliquely toward the lower and front side. The first socket arrangement section 19 opens rightward. The first socket arrangement section 19 has a substantially rectangular shape seen from the right side. The first socket 22 having a substantially parallelepiped shape is arranged in the first socket arrangement section 19.

The first socket 22 is made of synthetic resin and includes a first cavity 35 in which a first terminal 34 is to be arranged. The first cavity 35 is open obliquely toward the lower and front side and the first terminal 34 is arranged in the first cavity 35. A first branch cable 36 (one example of the cable) extends from a rear end of the first socket 22. Although details are not illustrated, the first terminal 34 and the first branch cable 36 are electrically connected to each other. The first branch cable 36 extends rearward from the first socket 22.

The frame 13 includes the second socket arrangement section 27 in the rear end section. The second socket arrangement section 27 protrudes obliquely toward the upper and rear side. The second socket arrangement section 27 opens rightward. The second socket arrangement section 27 has a substantially rectangular shape seen from the right side. The second socket 30 having a substantially parallelepiped shape is arranged in the second socket arrangement section 27.

The second socket 30 is made of synthetic resin and includes a second cavity 38 in which a second terminal 37 is to be arranged. The second cavity 38 is open obliquely toward the upper and rear side and the second terminal 37 is arranged in the second cavity 38. A second branch cable 39 (one example of the cable) extends from a front end of the second socket 30. Although details are not illustrated, the second terminal 37 and the second branch cable 39 are electrically connected to each other. The second branch cable 39 extends frontward from the second socket 30.

Figure 10:
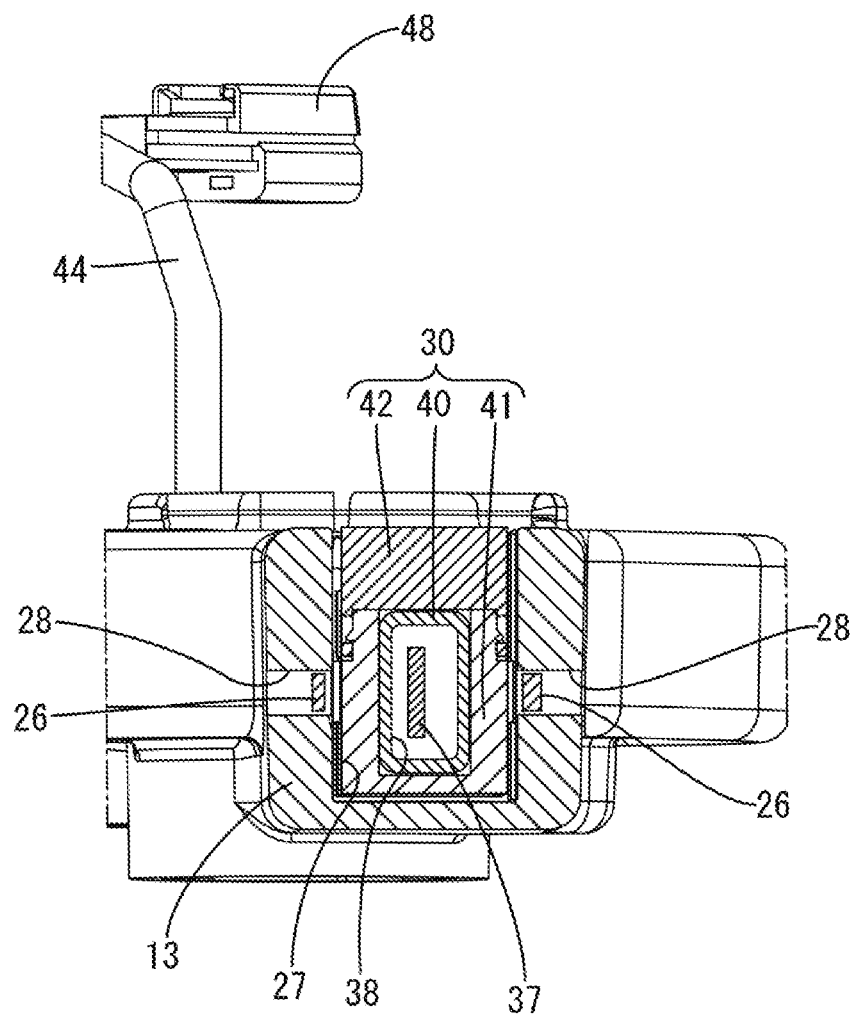
FIG. 10 is a cross-sectional view of FIG. 9 taken along X-X line.
Figure 11:
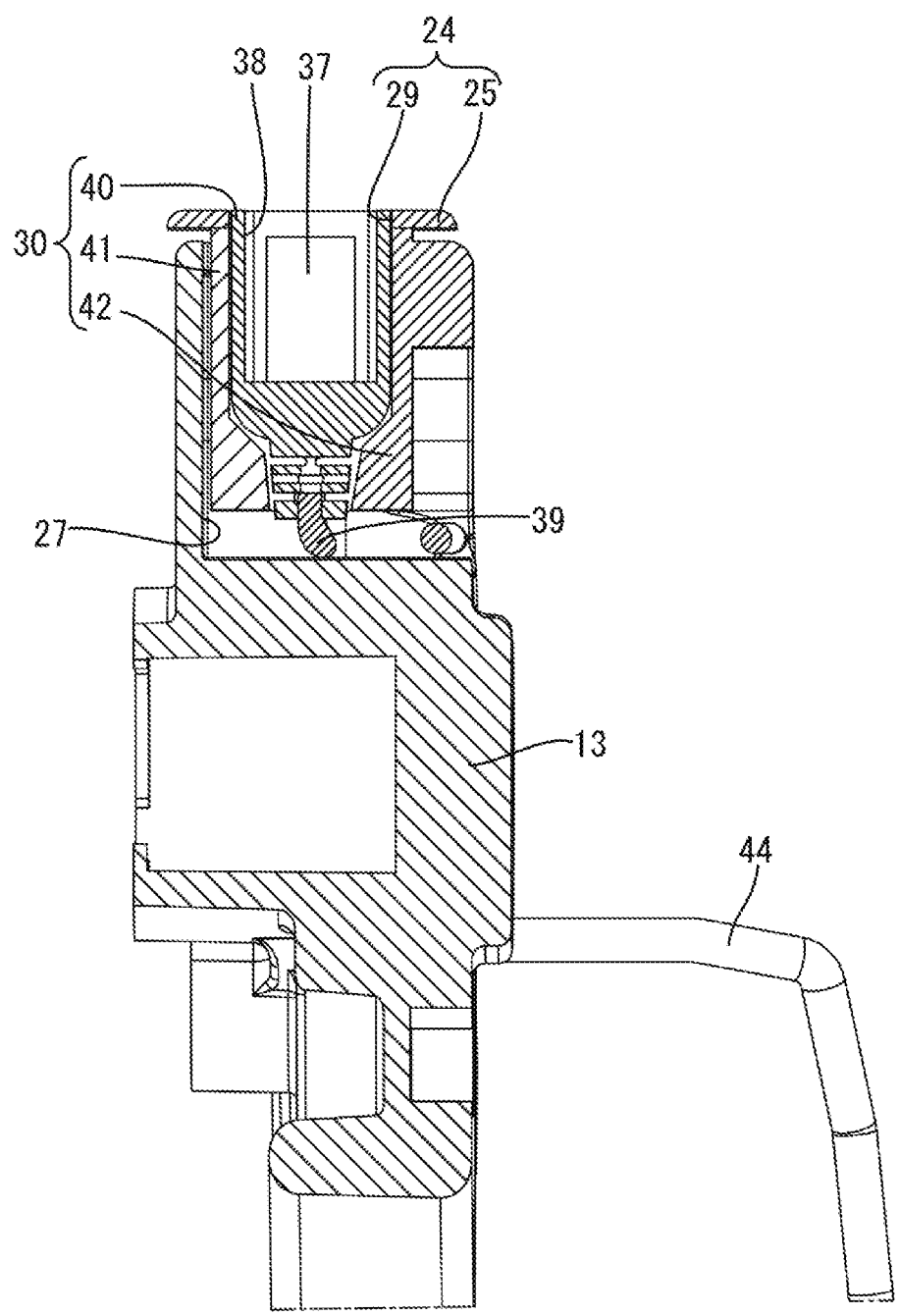
FIG. 11 is a cross-sectional view of HU 9 taken along XI-XI line.

As illustrated in FIGS. 10 and 11, the second socket 30 includes a second socket body section 40, a second body arrangement section 41, and a second cover member 42. The second socket body section 40 includes the second terminal 37. The second body arrangement section 41 is a groove that is open rightward and the second socket body section 40 is arranged in the second body arrangement section 41. The second cover member 42 is attached to the second body arrangement section 41 from the right side to cover the opening of the second body arrangement section 41. The second cover member 42 is attached to the second body arrangement section 41 in which the second socket body section 40 is arranged. This suppresses the foaming raw material from entering the second socket body section 40.

Although details are not illustrated, the first socket 22 has a configuration same as that of the second socket 30 and the configuration of the first socket 22 will not be described.

The first branch cable 36 and the second branch cable 39 branch from a main cable 43 near a middle section of the frame 13. The main cable 43 extends in the front rear direction and extends toward the rear side from the branch point where the main cable 43 branches into the first branch cable 36 and the second branch cable 39.

A rear end of the main cable 43 connected to a main connector 45 that connects the main cable 43 and a seat-side cable 44. Although details are not illustrated, the main cable 43 is electrically connected to the seat-side cable 44 in the main connector 45 with a known method.

A fixing member 46 made of synthetic resin is attached to the seat-side cable 44. The fixing member 46 includes a hook 47 and the seat-side cable 44 is hooked on the hook 47. The fixing member 46 includes a pressure fitting portion 46A that has a tapered distal end. The pressure fitting portion is put in the frame 13 with pressure and fixed to the frame 13 while being put through the frame 13. Thus, the seat-side cable 44 is fixed to the frame 13 (refer FIG. 7). The seat-side cable 44 extends rightward from the fixing member 46 that is fixed to the frame 13. A connector 48 that is to be connected to a vehicle-side cable is connected to a right-side end of the seat-side cable 44.

The frame 13 includes a main routing section 49, a first routing section 50 (one example of a routing section), and a second routing section 51 (one example of the routing section) that open rightward. The main cable 43 extends in the main routing section 49. The first branch cable 36 extends in the first routing section 50 and the second branch cable 39 extends in the second routing section 51. A connector arrangement section 52 is on the rear side of the main routing section 49 and opens rightward (refer FIG. 13). The main connector 45 and a portion of the seat-side cable 44 that is connected to the main connector 45 are arranged in the connector arrangement section 52. The connector arrangement section 52 is wider than the main routing section 49 with respect to an upper-lower direction.

The main routing section 49 extends in the front-rear direction and is communicated with the first routing section 50 via a front end portion of the main routing section 49. The first routing section 50 extends frontward from the front end portion of the main routing section 49 and the front end portion of the first routing section 50 is communicated with the first socket arrangement section 19.

The main routing section 49 is communicated with the second routing section 51 via a front end portion thereof. The second routing section 51 extends upward from the front end portion of the main routing section 49 and is curved toward the rear side and extends rearward. The rear end portion of the second routing section 51 is communicated with the second socket arrangement section 27.

Figure 12:
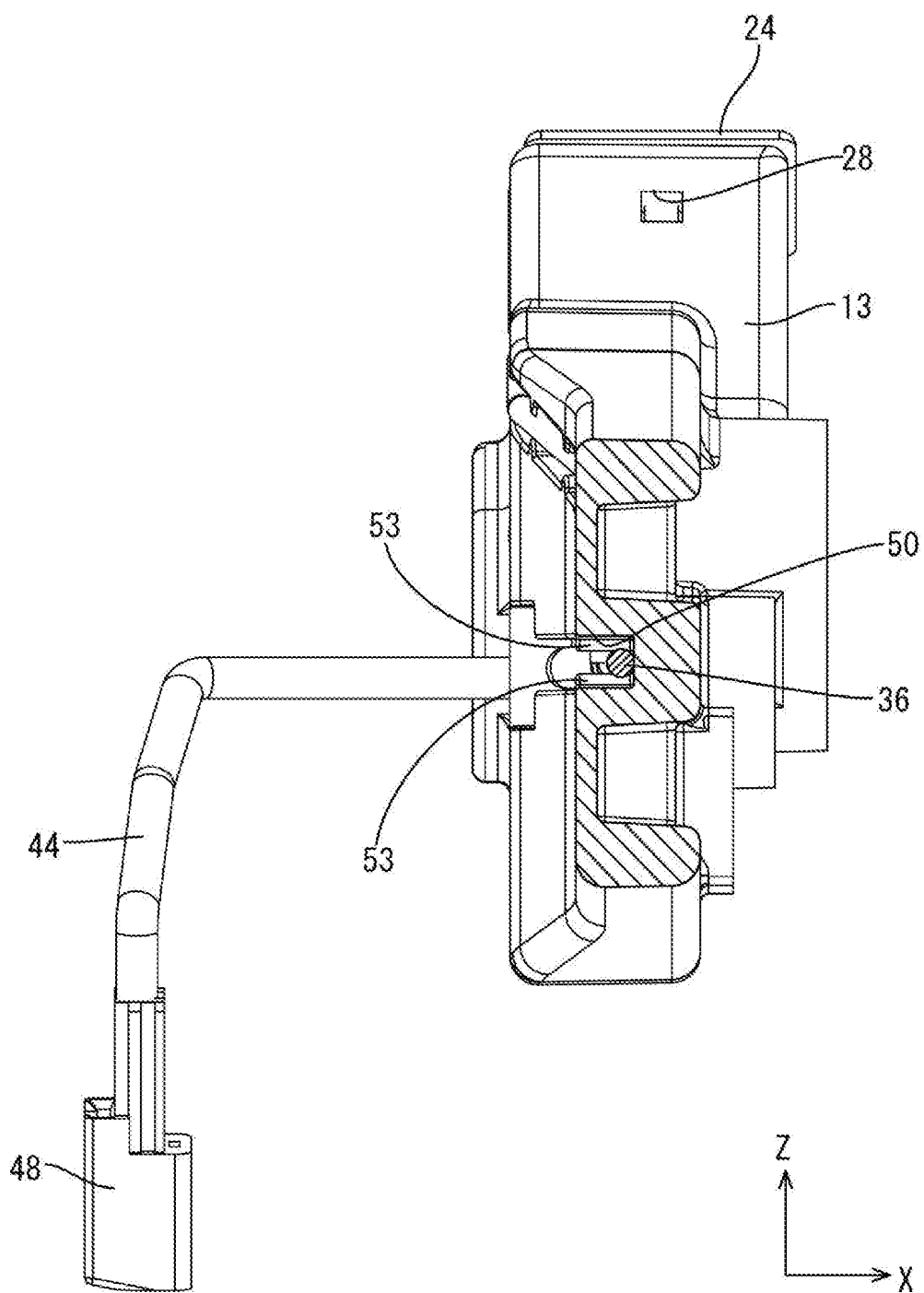
FIG. 12 is a cross-sectional view of FIG. 9 taken along XII-XII line.

As illustrated in FIG. 12, the first routing section 50 includes first retaining ribs 53 (one example of a retaining portion) on two side walls 71 thereof. The first retaining ribs 53 protrude inwardly from the side walls 71 and extend in the left-right direction. The first retaining ribs 53 on the two side walls 71 of the first routing section 50 are opposite each other, respectively. The opposing first retaining ribs 53 on the two side walls 71 of the first routing section 50 have a clearance therebetween and the clearance is equal to or slightly smaller than a diameter of the first branch cable 36. According to such a configuration, the first branch cable 36 that is held by the first retaining ribs 53 can be retained in the first routing section 50 so as not to be released therefrom.

As illustrated in FIG. 9, the second routing section 51 includes second retaining ribs 54 (one example of the retaining portion) on two side walls 81 thereof. The second retaining ribs 54 protrude inwardly from the side walls 81 and extend in the left-right direction. The second retaining ribs 54 on the two side walls 81 of the second routing section 51 are opposite each other, respectively. The opposing second retaining ribs 54 on the two side walls 81 of the second routing section 51 have a clearance therebetween and the clearance is equal to or slightly smaller than a diameter of the second branch cable 39. According to such a configuration, the second branch cable 39 that is held by the second retaining ribs 54 can be retained in the second routing section 51 so as not to be released therefrom.

As illustrated in FIG. 9, the first routing section 50 includes first lift-up ribs 55 (one example of a lift-up rib) on a bottom wall 70 thereof. The lift-up ribs 55 extend in a direction crossing the extending direction of the first routing section 50. The lift-up ribs 55 are arranged at intervals and protrude from the bottom wall 70. Similarly, the second routing section 51 includes second lift-up ribs 56 (one example of the lift-up rib).

The first branch cable 36 that is arranged in the first routing section 50 is spaced from the bottom wall 70 of the first routing section 50 by a protruding dimension of the first lift-up ribs 55 from the bottom wall 70 of the first routing section 50 at least at the portions thereof corresponding to the first lift-up ribs 55. Similarly, the second branch cable 39 is spaced from the bottom wall 80 of the second routing section 51 at least at the portions thereof corresponding to the second lift-up ribs 56.

The first branch cable 36 may be away from or may be in contact with the first lift-up ribs 55. Similarly, the second branch cable 39 may be away from or may be in contact with the second lift-up ribs 56.

Foamed Resin Material 14

A space between the skin 12 and the frame 13 is filled with the foamed resin material 14. The foamed resin material 14 is formed with a known method such as foaming liquid foaming raw material. The foamed resin material is preferably a soft material in view of protecting the cables from a stress caused by thermal expansion or thermal contraction when a temperature changes in the vehicular built-in environment. Urethane foam, foaming beads, or TIP urethane may be preferably used for such foamed resin material.

Figure 14:
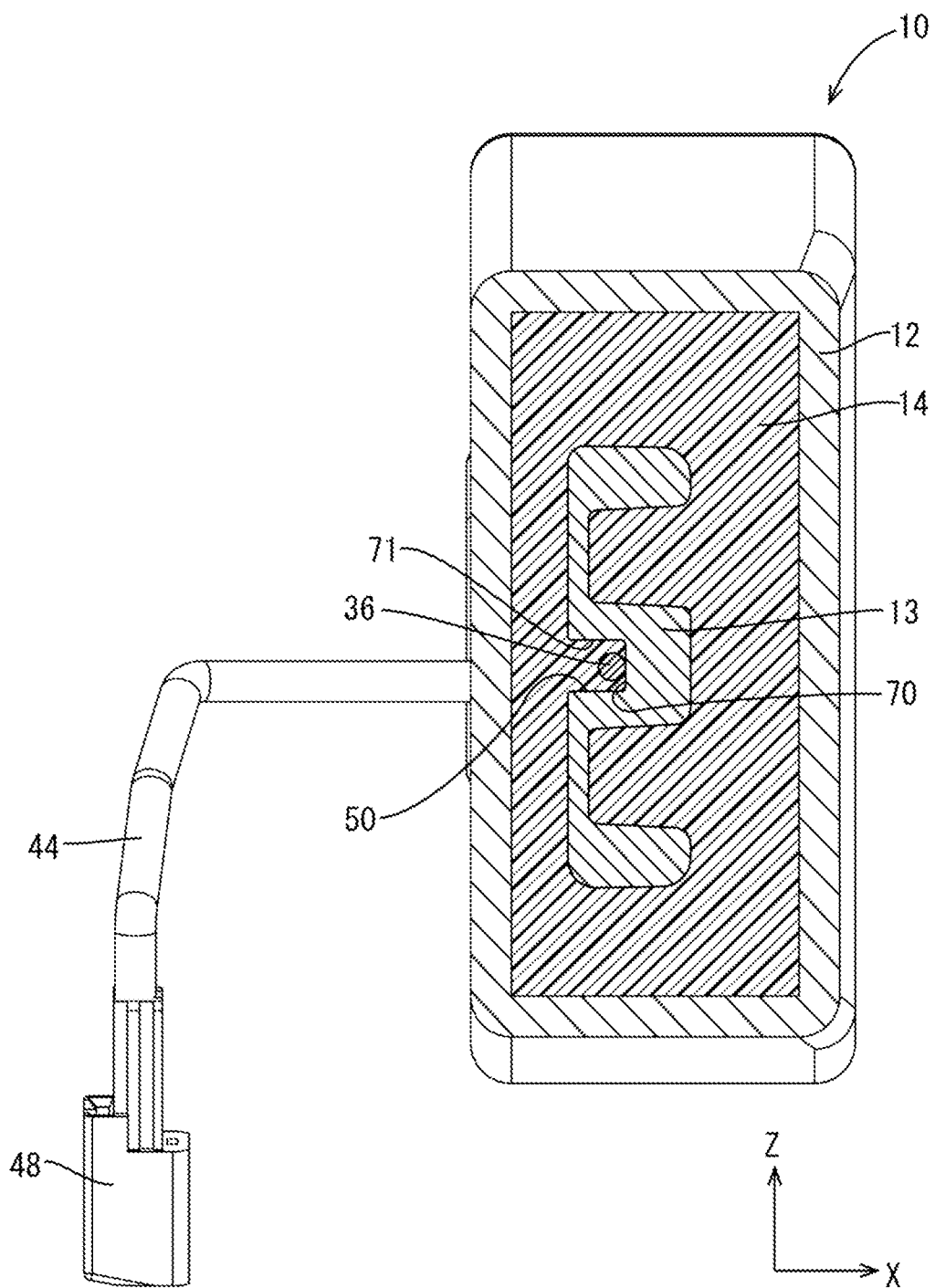
FIG. 14 is a cross-sectional view of FIG. 6 taken along XIV-XIV line.

As illustrated in FIG. 14, the first routing section 50 is filled with the foamed resin material 14 and the first branch cable 36 is disposed within the foamed resin material 14 in the first routing section 50. A space between the bottom wall 70 of the first routing section 50 and the first branch cable 36 is also filled with the foamed resin material 14.

Figure 15:
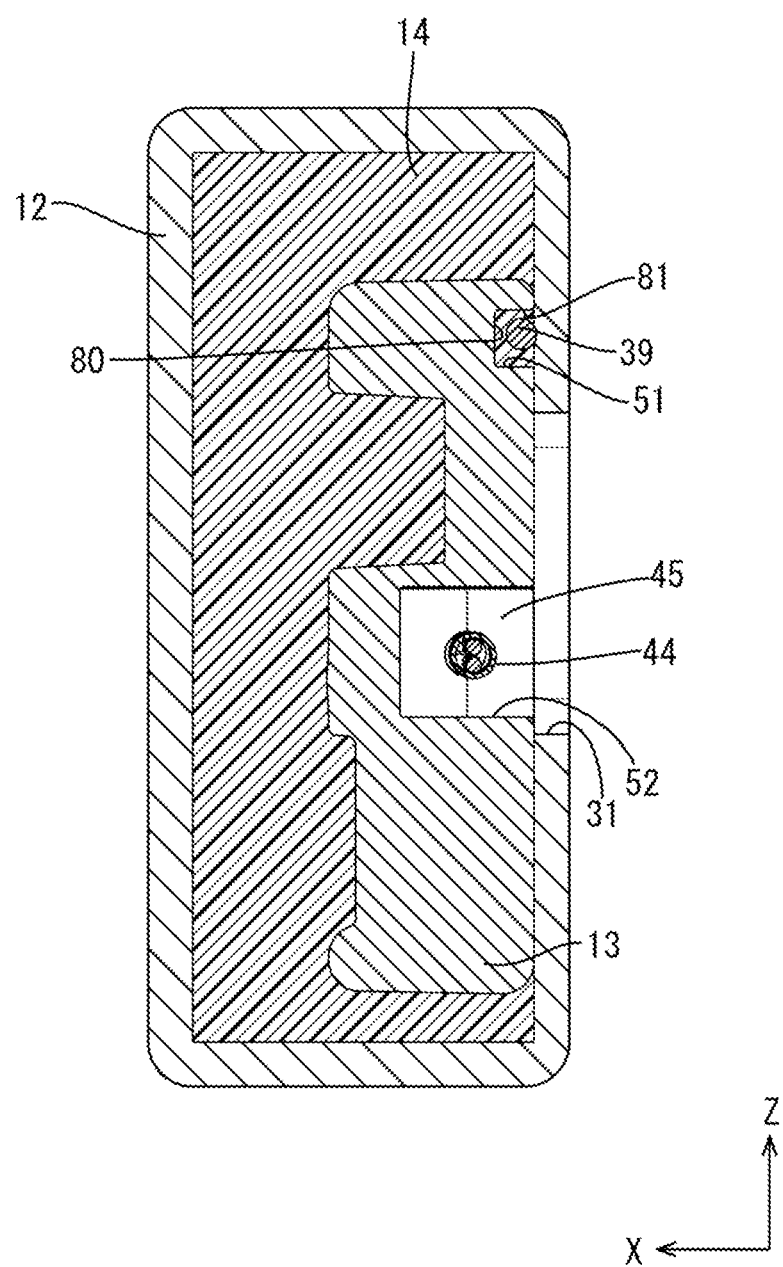
FIG. 15 is a cross-sectional view of FIG. 6 taken along XV-XV line.

As illustrated in FIG. 15, the second routing section 51 is filled with the foamed resin material 14 and the second branch cable 39 is disposed within the foamed resin material 14 in the second routing section 51. A space between the bottom wall 80 of the second routing section 51 and the second branch cable 39 is also filled with the foamed resin material 14. The main routing section 49 and the connector arrangement section 52 are not filled with the foamed resin material 14 and the main cable 43, the main connector 45, and the seat-side cable 44 are not disposed within the foamed resin material 14.

Figure 16:
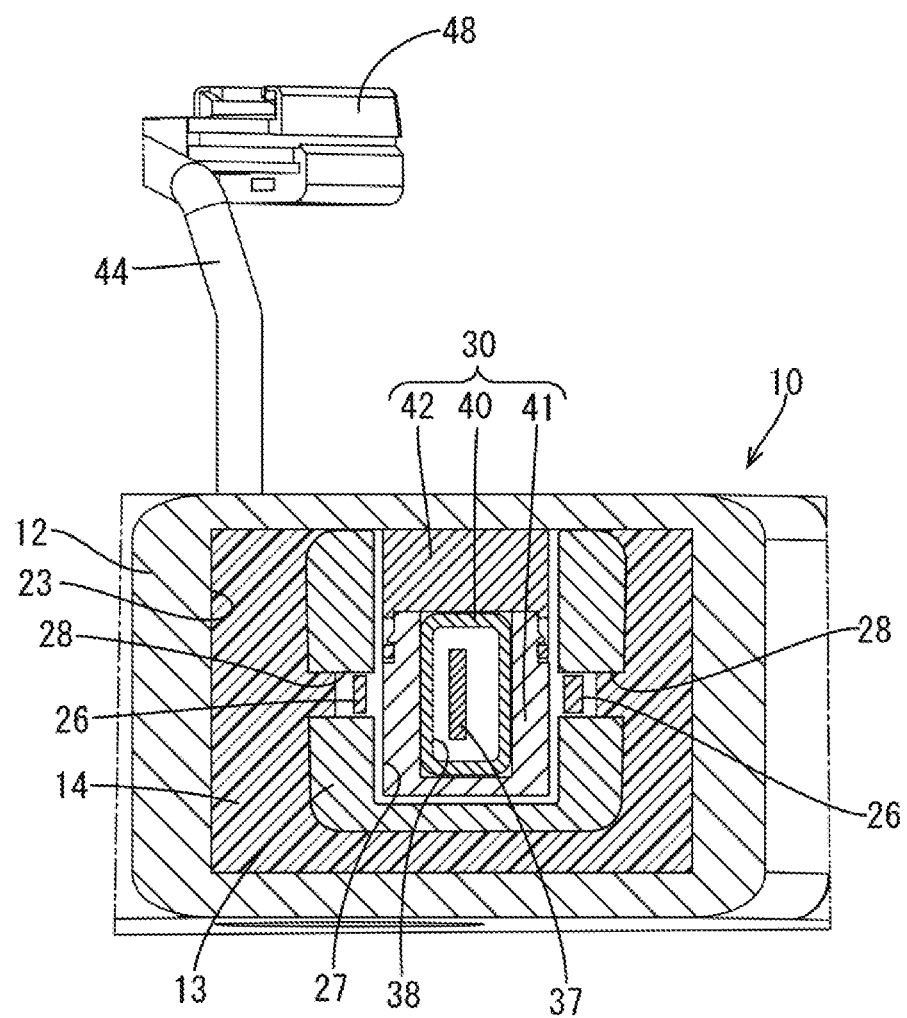
FIG. 16 is a cross-sectional view of FIG. 6 taken along XVI-XVI line.
Figure 17:
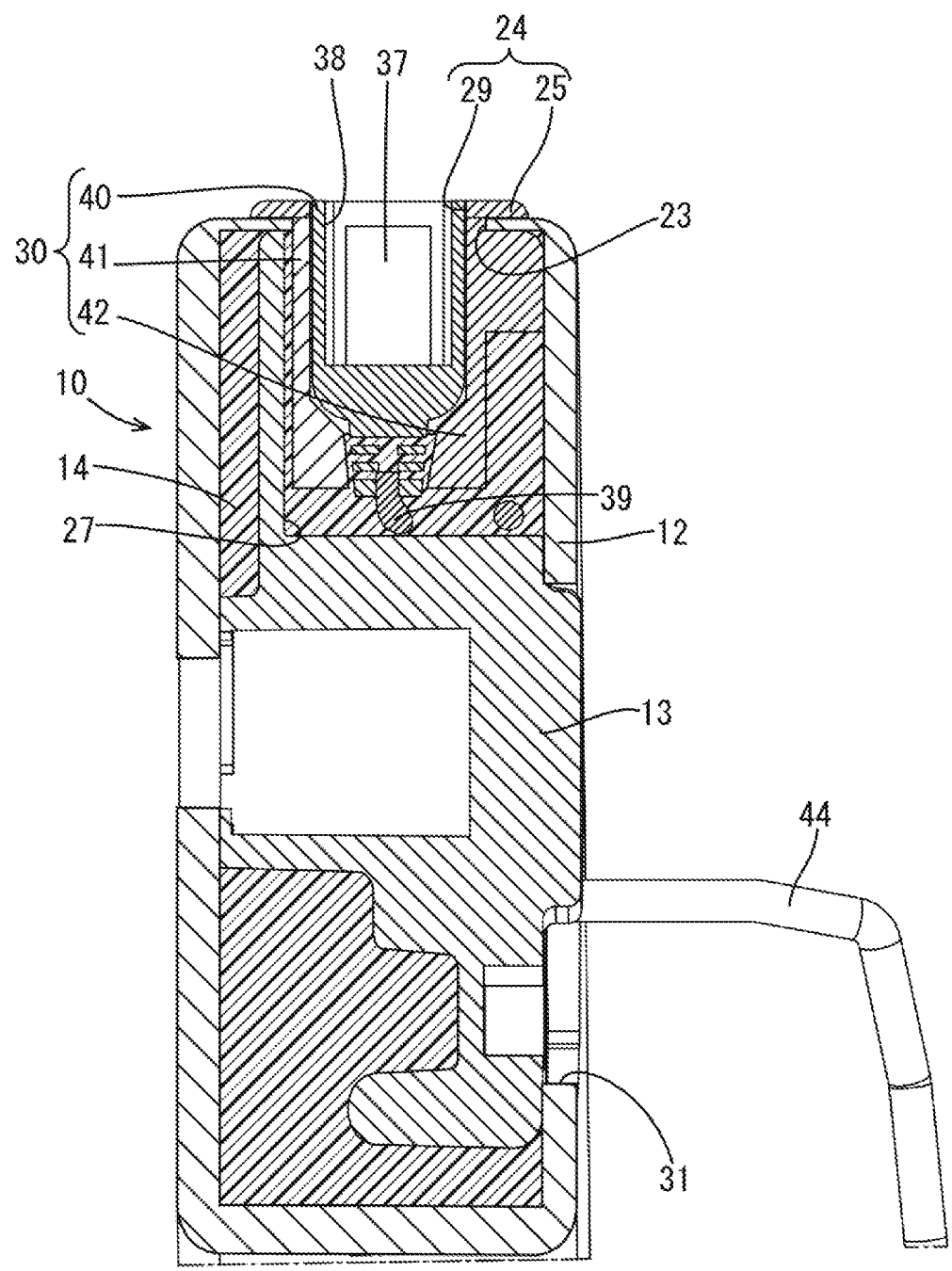
FIG. 17 is a cross-sectional view of FIG. 6 taken along XVII-XVII line.

As illustrated in FIGS. 16 and 17, the space between the skin 12 and the frame 13 is filled with the foamed resin material 14. On the other hand, the second cavity 38 of the second socket 30 is not filled with the foamed resin material 14. The second cavity 38 has a space around the second terminal 37 and a target connector, which is not illustrated, can be fitted to the second terminal 37.

Although details are not illustrated, similar to the second socket 30, the first cavity 35 of the first socket 22 is not filled with the foamed resin material 14 and the first cavity 35 has a space around the first terminal 34 and a target connector, which is not illustrated, can be fitted to the first terminal 34.

As illustrated in FIG. 17, the hole edge portion of the second skin hole 23 of the skin 12 is sandwiched between the second socket 30 and the second cover 24. According to such a configuration, the foaming raw material does not leak outside through the second skin hole 23 when the foaming raw material is injected into the inside of the skin 12.

Although details are not illustrated, similar to the above description, the skin 12 includes a first skin hole (not illustrated) corresponding to the first cover 16 and the hole edge portion of the first skin hole is sandwiched between the first socket 22 and the first cover 16. According to such a configuration, the foaming raw material does not leak outside through the first skin hole when the foaming raw material is injected into the inside of the skin 12.

Process of Producing Armrest 10

Next, one example of the process of producing the armrest 10 will be described. The process of producing the armrest 10 is not limited to the one described below.

The main cable 43 and the seat-side cable 44 are connected to each other via the main connector 45. The first socket 22 and the second socket 30 are connected to ends of the first branch cable 36 and the second branch cable 39, respectively, that are branches of the main cable 43.

The frame 13 is formed with injection molding by injecting synthetic resin material. The first branch cable 36 is pushed into a space between the first retaining ribs 53 that protrude from the two side walls 71 of the first routing section 50. Accordingly, the first branch cable 36 is arranged in the first routing section 50 of the frame 13. Subsequently, the first socket 22 is arranged in the first socket arrangement section 19.

Similarly, the second branch cable 39 is pushed into a space between the second retaining ribs 54 that protrude from the two side walls 81 of the second routing section 51. Accordingly, the second branch cable 39 is arranged in the second routing section 51 of the frame 13. Subsequently, the second socket 30 is arranged in the second socket arrangement section 27.

The main cable 43 is arranged in the main routing section 49. The main connector 45 and the front end portion of the seat-side cable 44 are arranged in the connector arrangement section 52. Then, the fixing member 46 is attached to the frame 13 such that the seat-side cable 44 is fixed to and retained by the frame 13 while the seat-side cable 44 extending outside the frame 13.

The skin 12 is formed into a bag shape with using cloth or leather. The frame 13 in which the main cable 43, the first branch cable 36, and the second branch cable 39 are routed is put in the bag-shaped skin 12.

The second stopper pieces 26 of the second cover 24 are put in the second skin hole 23 of the skin 12 and are stopped at the hole edge of the second stopper hole 28. Accordingly, the second cover 24 is attached to the frame 13 while the hole edge of the second skin hole 23 of the skin 12 being sandwiched between the second socket 30 and the second plate member 25 of the second cover 24.

Similarly, the first cover 16 is attached to the frame 13 while the hole edge being sandwiched between the first socket 22 and the first plate member 17 of the first cover 16.

The skin 12 including the frame 13 therein is put in a mold, which is not illustrated, and the skin 12 and the frame 13 are positioned within the mold with a known method.

The foaming raw material is injected through the injection hole 33 of the frame 13. Then, the foaming raw material is foamed with a known method to form the foamed resin material 14. After the foaming process, the armrest 10 is removed from the mold. Thus, the armrest 10 is completed.

Operations and Advantageous Effects of Embodiment

Next, operations and advantageous effects of the present embodiment will be described. The armrest 10 according to the present embodiment includes the first branch cable 36, the second branch cable 39, the frame 13, the skin 12 covering the frame 13, and the foamed resin material 14. The frame 13 includes the first routing section 50 and the second routing section 51 in which the first branch cable 36 and the second branch cable 39 are arranged, respectively. The inner space surrounded by the skin 12 is filled with the foamed resin material 14. The first branch cable 36 and the second branch cable 39 are disposed within the foamed resin material 14 in the first routing section 50 and the second routing section 51, respectively.

According to the above configuration, after the first branch cable 36 is routed in the first routing section 50 of the frame 13 and the second branch cable 39 is routed in the second routing section 51, the inner space surrounded by the skin 12 is filled with the foamed resin material 14. Then, the foamed resin material 14 is foamed and accordingly, the first branch cable 36 and the second branch cable 39 are put within the foamed resin material 14. Thus, the first branch cable 36 and the second branch cable 39 are routed within the armrest 10 that includes the foamed resin material 14 therein.

If the armrest 10 receives force, the first branch cable 36 and the second branch cable 39 that are protected by the foamed resin material 14 are less likely to receive the force.

Since the first branch cable 36 and the second branch cable 39 are disposed within the foamed resin material 14, a fixing member for fixing the first branch cable 36 and the second branch cable 39 is not additionally required. This can simplify the structure of the armrest 10 and reduce the number of components.

In the present embodiment, the first routing section 50 includes the first retaining ribs 53 that are in contact with the first branch cable 36 to suppress the first branch cable 36 from dropping from the first routing section 50 before the inner space is filled with the roamed resin material 14. The second routing section 51 includes the second retaining ribs 54 that are in contact with the second branch cable 39 to suppress the second branch cable 39 from dropping from the second routing section 51 before the inner space is filled with the roamed resin material 14.

In the above configuration, the first branch cable 36 that is routed in the first routing section 50 is less likely to drop from the first routing section 50 before the inner space is filled with the foamed resin material 14. Similar to the above, the second branch cable 39 that is routed in the second routing section 51 is less likely to drop from the second routing section 51 before the inner space is filled with the foamed resin material 14. Accordingly, when the first branch cable 36 and the second branch cable 39 are routed in the frame 13, it is not necessary to be careful about dropping of the first branch cable 36 and the second branch cable 39 from the frame 13. This can improve production efficiency of the armrest 10.

In the present embodiment, the first retaining ribs 53 hold the first branch cable 36 from two sides with respect to the extending direction of the first branch cable 36. The second retaining ribs 54 hold the second branch cable 39 from two sides with respect to the extending direction of the second branch cable 39. This surely suppresses the first branch cable 36 and the second branch cable 39 from dropping from the first routing section 50 and the second routing section 51 before the inner space is filled with the foamed resin material 14.

In the present embodiment, the first routing section 50 and the second routing section 51 are formed in a groove shape. The first lift-up ribs 55 and the second lift-up ribs 56 protrude from the respective bottom walls 70, 80 of the first routing section 50 and the second routing section 51. The first lift-up ribs 55 extend in a direction crossing the extending direction of the first branch cable 36 and the second lift-up ribs 56 extend in a direction crossing the extending direction of the second branch cable 39.

According to the above configuration, the first branch cable 36 that is disposed in the groove-shaped first routing section 50 is away from the bottom wall 70 of the first routing section 50 by the protruding dimension of the first lift-up ribs 55 from the bottom wall 70 of the first routing section 50 at least at the portions thereof corresponding to the first lift-up ribs 55. According to such a configuration, the space between the first branch cable 36 and the bottom wall 70 of the first routing section 50 is filled with the foamed resin material 14. Thus, the first branch cable 36 is surely disposed within the foamed resin material 14. Similarly, the second branch cable 39 that is disposed in the groove-shaped second routing section 51 is away from the bottom wall 80 of the second routing section 51 by the protruding dimension of the second lift-up ribs 56 from the bottom wall 80 of the second routing section 51 at least at the portions thereof corresponding to the second lift-up ribs 56. According to such a configuration, the space between the second branch cable 39 and the bottom wall 80 of the second routing section 51 is filled with the foamed resin material 14. Thus, the second branch cable 39 is surely disposed within the foamed resin material 14.

In the present embodiment, the skin 12 includes the first skin hole and the first socket 22 that is connected to the first branch cable 36 is exposed from the first skin hole. The skin 12 includes the second skin hole 23 and the second socket 30 that is connected to the second branch cable 39 is exposed from the second skin hole 23.

According to the above configuration, a portable device (not illustrated) can be connected to one or both of the first socket 22 and the second socket 30 included in the armrest 10 that is disposed near the vehicle occupant's hand. According to such a configuration, a cable for connecting a portable device and the first socket 22 or the second socket 30 is not necessary to be routed within a compartment of a vehicle.

In the present embodiment, the cable includes the main cable 43, the first branch cable 36 and the second branch cable 39 that are branches of the main cable 43. The first branch cable 36 and the second branch cable 39 are connected to the first socket 22 and the second socket 30, respectively.

According to the above configuration, the armrest 10 can include two sockets. Therefore, portable devices can be connected to the vehicle and this improves convenience for the occupants of a vehicle in using the portable devices.

In the present embodiment, the first cover 16 is attached to the hole edge of the first skin hole and the first cover 16 includes the first cover hole 21 corresponding to the first skin hole. The first socket 22 is exposed from the first cover hole 21 and the first cover 16 and the first socket 22 sandwich the portion of the skin 12 that is adjacent to the hole edge of the first skin hole. Similarly, the second cover 24 is attached to the hole edge of the second skin hole 23 and the second cover 24 includes the second cover hole 29 corresponding to the second skin hole 23. The second socket 30 is exposed from the second cover hole 29 and the second cover 24 and the second socket 30 sandwich the portion of the skin 12 that is adjacent to the hole edge of the second skin hole 23.

According to the above configuration, the first cover 16 and the first socket 22 sandwich the portion of the skin 12 adjacent to the hole edge of the first skin hole and the foamed resin material 14 that is put in the space surrounded by the skin 12 is less likely to leak through the first skin hole. Similarly, the second cover 24 and the second socket 30 sandwich the portion of the skin 12 adjacent to the hole edge of the second skin hole 23 and the foamed resin material 14 that is put in the space surrounded by the skin 12 is less likely to leak through the second skin hole 23.

The hole edges of the first skin hole and the second skin hole 23 can be covered and this improves an outer appearance of the armrest 10.

Furthermore, the first socket and the second socket 30 can be reinforced. Therefore, when a target plug is inserted in or removed from the first socket and the second socket 30, the force to be applied to the first socket and the second socket 30 can be reduced. Thus, problems are less likely to be caused in the first socket and the second socket 30.

Second Embodiment

Next, a second embodiment of the technology described herein will be described with reference to FIGS. 18 to 20.

Figure 18:
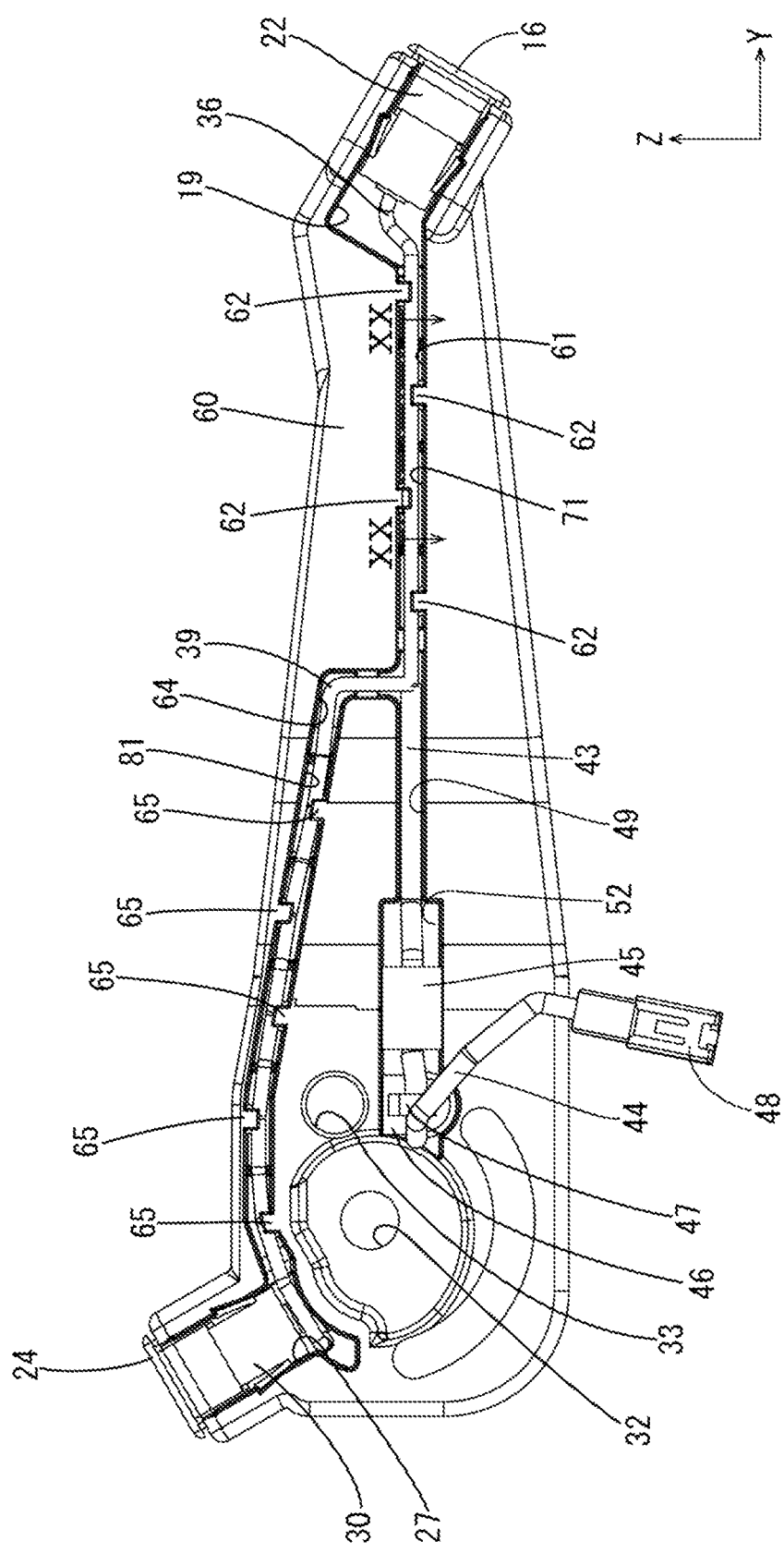
FIG. 18 is a right side view illustrating a frame where a cable is routed in an armrest according to a second embodiment.

As illustrated in FIG. 18, according to the second embodiment, a first routing section 61 of a frame 60 includes first retaining pieces 62 (one example of the retaining portion) at opening edges of side walls 71 thereof. The first retaining pieces 62 protrude toward an inner side of the first routing section 61. The first retaining pieces 62 are formed on two side walls 71 of the first routing section 61 alternately in a zig-zag manner with respect to the extending direction of the first routing section 61.

Even if the first branch cable 36 that is arranged in the first routing section 61 receives a force so as to be released from the first routing section 61, the first branch cable 36 that is in contact with the first retaining pieces 62 is less likely to be released from the first routing section 61.

Figure 19:
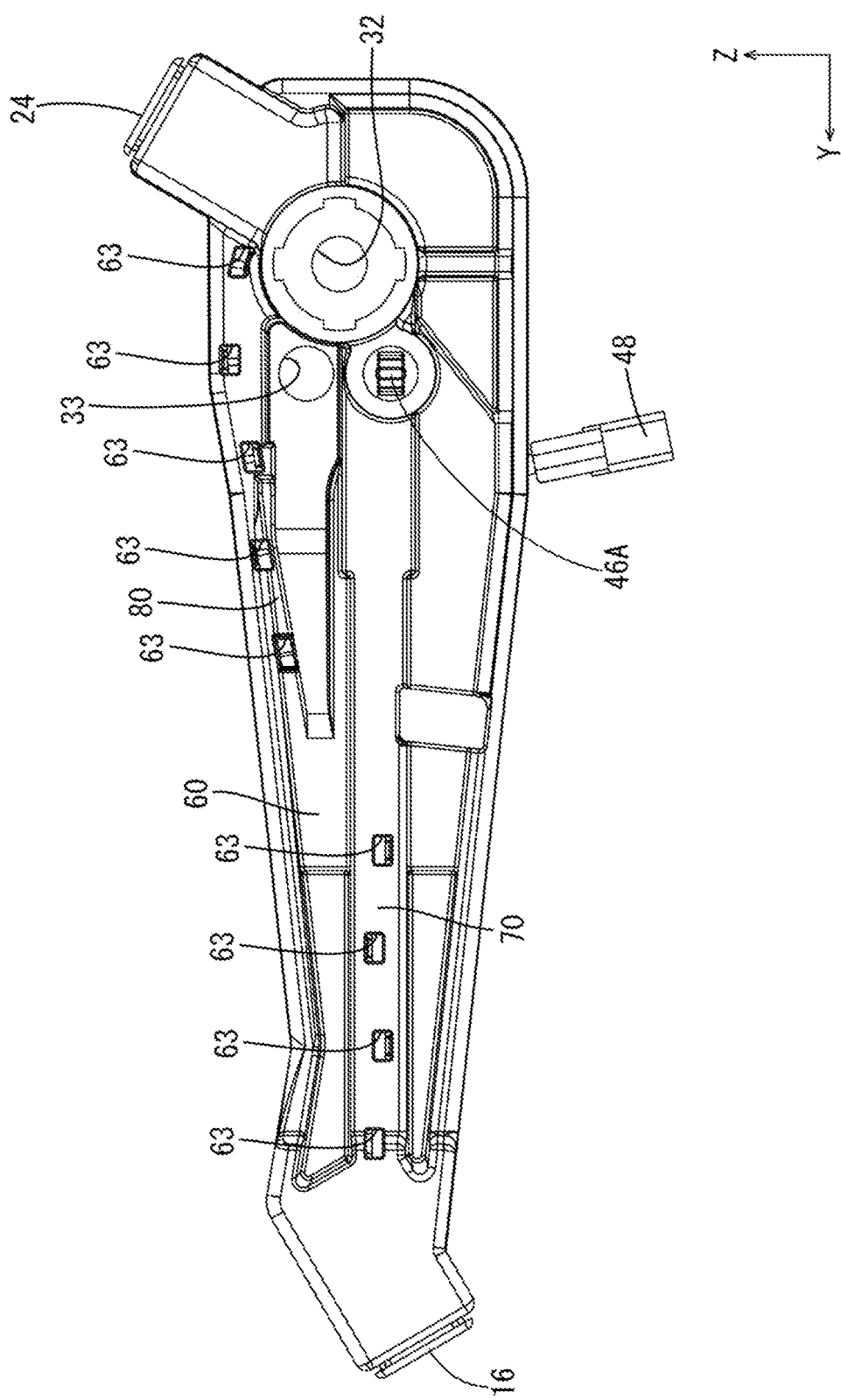
FIG. 19 is a left side view illustrating the frame where the cable is routed.
Figure 20:
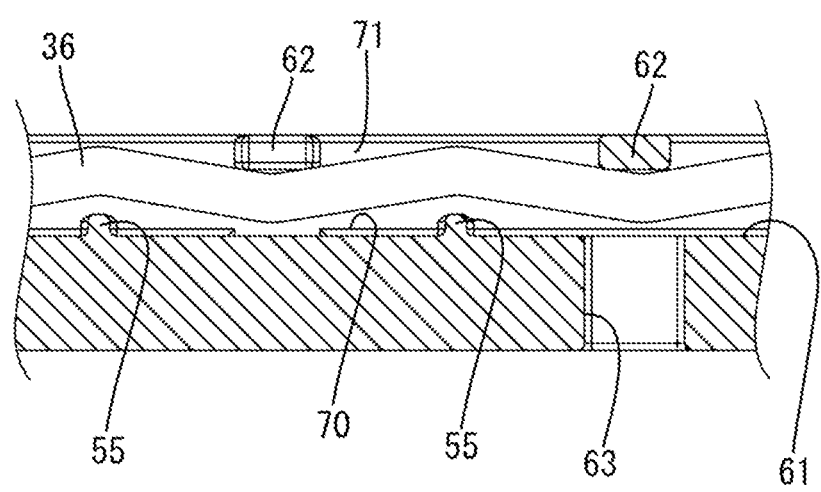
FIG. 20 is a cross-sectional view of FIG. 18 taken along XX-XX line.

As illustrated in FIGS. 19 and 20, the first routing section 61 includes molding holes 63 in a bottom wall 70 of the first routing section 61 corresponding to the first retaining pieces 62. The molding holes 63 extend through the bottom wall 70 and are for molding the first retaining pieces 62.

As illustrated in FIG. 18, a second routing section 64 includes second retaining pieces 65 (one example of the retaining portion) at opening edges of side walls 81 thereof. The second retaining pieces 65 protrude toward an inner side of the second routing section 64. The second retaining pieces 65 are formed on two side walls 81 of the second routing section 64 alternately in a zigzag manner with respect to the extending direction of the second routing section 64.

Even if the second branch cable 39 that is arranged in the second routing section 64 receives a force so as to be released from the second routing section 64, the second branch cable 39 that is in contact with the second retaining pieces 65 is less likely to be released from the second routing section 64.

As illustrated in FIG. 19, the second routing section 64 includes the molding holes 63 in a bottom wall 80 of the second routing section 64 corresponding to the second retaining pieces 65. The molding holes 63 extend through the bottom wall 80 and are for molding the second retaining pieces 65.

Configurations other than the above are substantially same as those in the first embodiment. The components same as those in the first embodiment are provided with the same symbols and will not be described.

When the space inside the skin 12 is filled with the foamed resin material 14, the foamed resin material 14 is unlikely to flow to portions far away from the injection hole 33 through which the foamed resin material 14 is supplied. However, in the present embodiment, the foamed resin material 14 flows through the molding holes 63, which are formed in the bottom walls 70, 80 of the groove-shaped first routing section 61 and the groove-shaped second routing section 64, into the first routing section 61 and the second routing section 64. Therefore, the first branch cable 36 and the second branch cable 39 that are arranged in the first routing section 61 and the second routing section 64, respectively, can be surely disposed within the foamed resin member 14.

Other Embodiments

The technology disclosed herein is not limited to the embodiments described above and illustrated in the drawings. For example, the following embodiments will be included in the technical scope of the technology.

(1) In the above embodiments, the frame 13 is made of synthetic resin. However, the embodiments are not limited to the configuration. For example, the frame 13 may be made of metal.

(2) In the above embodiments, the first cover 16 is attached to the first skin hole and the second cover 24 is attached to the second skin hole 23. However, the embodiments are not limited to the configuration and may not include the first cover 16 and the second cover 24.

(3) In the present embodiments, one armrest 10 includes the first socket 22 and the second socket 30. However, the embodiments are not limited to the configuration and one armrest 10 may include one socket or include three or more sockets.

(4) The armrest 10 may be mounted on the seat 11 so as to be rotatable or not to be rotatable.

(5) Sockets of any one of the standards such as sockets for a USB (universal serial bus), Thunderbolt (registered trademark), and Ethernet (registered trademark) may be used as the sockets.

(6) In the above embodiments, the routing sections are formed in a groove shape. However, the embodiments are not limited to the configuration. The frame 13 may include pins protruding from one surface thereof and the cable may be held by the pins. The frame 13 may include hook-shaped pieces on one surface thereof and the cable may be supported and routed by the pieces.

(7) In the above embodiments, the first routing section 50 includes the first lift-up ribs 55 on the bottom wall 70 thereof and the second routing section 51 includes the second lift-up ribs 56 on the bottom wall 80 thereof. However, the embodiments may not include the first lift-up ribs 55 and the second lift-up ribs 56.

EXPLANATION OF SYMBOLS

10: armrest
12: skin
13: frame

14: foamed resin material
16: first cover
21: first cover hole
22: first socket
23: second skin hole
24: second cover
29: second cover hole
30: second socket
36: first branch cable
39: second branch cable
50, 61: first routing section
51, 64: second routing section
53: first retaining rib
54: second retaining rib
55: first lift-up rib
56: second lift-up rib
62: first retaining piece
63: molding hole

The invention claimed is:

1. An armrest comprising:
a cable;
a frame including a routing section where the cable is disposed;
a skin covering the frame; and
foamed resin material that is disposed on an inner side of the skin, wherein
the cable is disposed within the foamed resin material in the routing section,
the routing section includes a retaining portion that is in contact with the cable to suppress the cable from being released from the routing section before being filled with the foamed resin material, and
the routing section has a groove shape and includes a lift-up rib protruding from a bottom wall of the routing section and the lift-up rib extends in a direction crossing an extending direction in which the cable extends.

2. The armrest according to claim 1, wherein the retaining portion sandwiches the cable from two sides with respect to an extending direction in which the cable extends.

3. The armrest according to claim 1, wherein the routing section includes a molding hole in a bottom wall of the routing section and the molding hole is for forming the retaining portion.

4. The armrest according to claim 1, wherein
the skin includes a skin hole, and
a socket that is connected to the cable is exposed from the skin hole.

5. The armrest according to claim 4, wherein
the cable includes cables that are arranged in the frame, and
the socket includes sockets that are connected to the respective cables.

6. The armrest according to claim 4, further comprising:
a cover attached to a hole edge of the skin hole and including a cover hole corresponding to the skin hole, wherein
the socket is exposed from the cover hole, and
a portion of the skin adjacent to the hole edge of the skin hole is sandwiched between the cover and the socket.

7. An armrest comprising:
a cable;
a frame including a routing section where the cable is disposed;
a skin covering the frame; and
foamed resin material that is disposed on an inner side of the skin, wherein
the cable is disposed within the foamed resin material in the routing section,
the routing section includes a retaining portion that is in contact with the cable to suppress the cable from being released from the routing section before being filled with the foamed resin material, and
the routing section has a groove shape and includes a molding hole in a bottom wall of the routing section and the molding hole is for forming the retaining portion.

8. The armrest according to claim 7, wherein the retaining portion sandwiches the cable from two sides with respect to an extending direction in which the cable extends.

9. The armrest according to claim 7, wherein
the skin includes a skin hole, and
a socket that is connected to the cable is exposed from the skin hole.

10. The armrest according to claim 9, wherein
the cable includes cables that are arranged in the frame, and
the socket includes sockets that are connected to the respective cables.

11. The armrest according to claim 9, further comprising:
a cover attached to a hole edge of the skin hole and including a cover hole corresponding to the skin hole, wherein
the socket is exposed from the cover hole, and
a portion of the skin adjacent to the hole edge of the skin hole is sandwiched between the cover and the socket.

12. An armrest comprising:
a cable;
a frame including a routing section where the cable is disposed, the routing section including a bottom wall and a side wall;
a skin covering the frame; and
foamed resin material that is disposed on an inner side of the skin, wherein
the cable is disposed within the foamed resin material in the routing section,
the routing section has a groove shape and includes a retaining portion in the side wall of the routing section, and
the retaining portion is in contact with the cable to suppress the cable from being released from the routing section before being filled with the foamed resin material.

13. The armrest according to claim 12, wherein the retaining portion sandwiches the cable from two sides with respect to an extending direction in which the cable extends.

14. The armrest according to claim 12, wherein the routing section includes a lift-up rib protruding from the bottom wall of the routing section and the lift-up rib extends in a direction crossing an extending direction in which the cable extends.

15. The armrest according to claim 12, wherein the routing section includes a molding hole in the bottom wall of the routing section and the molding hole is for forming the retaining portion.

16. The armrest according to claim 12, wherein
the skin includes a skin hole, and
a socket that is connected to the cable is exposed from the skin hole.

17. The armrest according to claim 16, wherein
the cable includes cables that are arranged in the frame, and
the socket includes sockets that are connected to the respective cables.

18. The armrest according to claim 16, further comprising:
- a cover attached to a hole edge of the skin hole and including a cover hole corresponding to the skin hole, wherein
- the socket is exposed from the cover hole, and
- a portion of the skin adjacent to the hole edge of the skin hole is sandwiched between the cover and the socket.

* * * * *